(12) United States Patent
Lahti et al.

(10) Patent No.: US 7,155,521 B2
(45) Date of Patent: Dec. 26, 2006

(54) STARTING A SESSION IN A SYNCHRONIZATION SYSTEM

(75) Inventors: Jerry Lahti, Vantaa (FI); Mikko Sahinoja, Tampere (FI); Gaurav Mittal, San Diego, CA (US)

(73) Assignee: Nokia Corporation, Espoo (FI)

( * ) Notice: Subject to any disclaimer, the term of this patent is extended or adjusted under 35 U.S.C. 154(b) by 726 days.

(21) Appl. No.: 09/974,021

(22) Filed: Oct. 9, 2001

(65) Prior Publication Data

US 2003/0101329 A1   May 29, 2003

(51) Int. Cl.
   *G06F 13/00* (2006.01)
(52) U.S. Cl. .................................... 709/227
(58) Field of Classification Search ................ 709/227
   See application file for complete search history.

(56) References Cited

U.S. PATENT DOCUMENTS

| 6,000,000 A | 12/1999 | Hawkins et al. ............ 707/201 |
| 6,292,668 B1 | 9/2001 | Alanara et al. ............. 455/466 |

FOREIGN PATENT DOCUMENTS

| EP | 1122925 A1 | 8/2001 |
| JP | 2001086001 A | 9/1999 |
| JP | 2001244993 A | 1/2000 |
| WO | WO 98/24018 | 6/1998 |
| WO | WO 00/29998 | 5/2000 |
| WO | 0158069 A1 | 9/2001 |

OTHER PUBLICATIONS

"SyncML Sync Protocol", Version 1.0.1, 2001.
SyncML Sync Protocol, version 1.0, http://www.syncml.orp/docs/syncml_protocol v10 20001207, pp. 1-60, Version 1.0 Dec. 7, 2000.
SyncML Sync Protocol, version 1.0.1, http://www.syncml.org/docs/syncml_protocol_v101 20010615, pp. 1-61, Version 1.0.1 Jun. 15, 2001.
Material From Affiliates-SyncML, OMA Technical Section—Affiliates—SyncML pp. 1-3, http://www.openmobilealliance.org/tech/affiliates/syncml/syncml/syncmlindex.html, May 5, 2006.
XML: Managing Data Exchange / SyncML, XML: Managing Data Exchange / SyncML-Wikibooks, collection of open-context textbooks, pp. 1-10, http://en.wikibooks.org/w/index.php?title=XML:_Managing_Data_Exchange/SyncML&prin . . . , May 5, 2006.

*Primary Examiner*—Robert B. Harrell
(74) *Attorney, Agent, or Firm*—Perman&Green, LLP.

(57) ABSTRACT

A method of starting a session in a synchronization system. The maximum size of a message that is to be sent from a synchronization server to a mobile station for the request, and coding instructions, by which at least one of the identifiers can be coded into a bit sequence requiring substantially fewer bits than its ASCII presentation, are determined in the synchronization server. Decoding instructions, by means of which the original identifier is obtained from the bit sequence, are determined in the mobile station. When the purpose is to transmit a request indicating the need for starting a session to at least one mobile station, a message is formed, is shorter or as long as the maximum size and includes the pre-selected identifiers, at least one of which is presented as a bit sequence defined according to the coding instructions. The mobile station forms a session initialization message on the basis of the information included in the message received from the server, at least part of information being defined from the received bit sequence according to the decoding instructions.

32 Claims, 3 Drawing Sheets

STARTING A SESSION IN A SYNCHRONIZATION SYSTEM

BACKGROUND OF THE INVENTION

The invention relates to arranging a session between a synchronization server and a client device and particularly to starting a session on the initiative of a synchronization server.

Data of portable terminals, such as mobile phones, can be synchronized with network applications, desktop computer applications or other databases of the telecommunication system. In particular, data of calendar and e-mail applications are typically synchronized. Previously, synchronization has been based on the use of different manufacturer-specific protocols which are incompatible. This limits the use of terminals or data types to be used and often causes difficulty to the user. In mobile communication, in particular, it is important that data can be retrieved and updated regardless of the terminal and application used. To improve synchronization of application data, a SyncML (Synchronization Markup Language), which is based on the XML language (Extensible Markup Language), has been developed. By using a SyncML synchronization protocol, which employs SyncML messages, data of any application can be synchronized between networked terminals of any kind.

FIG. 1 illustrates an example of synchronization where a mobile station MS acts as a SyncML client device and a network server S acts as a SyncML server. The SyncML synchronization service comprises first initializing a synchronization session (SyncML Session Initialization) during which, for example, the database to be synchronized is selected. A client agent MS sends the server S a SyncML message (Client Modifications) comprising at least the data which are to be synchronized in the mobile station MS and have changed since the last synchronization. The server S synchronizes the data sets, i.e. analyzes the changes made to the data sets and harmonizes the data (makes the necessary modifications, replacements, deletions and additions). After this, the server S sends the server modifications back to the client device TE, which makes the necessary changes to its database.

Other types of data can also be synchronized by means of the SyncML, whereby a new setting relating to synchronization, for instance, can be synchronized to the client device. Generally, device management refers to procedures, by which third parties can change the configuration of a device, e.g. change settings or even a protocol used by the device. Besides settings relating only to the device, it is also possible to send user-specific data, such as user profiles, logos, ringing tones and menus, by means of which the user can personalize the settings of the device or the adaptations are made automatically in the device management. Features which have been defined in the SyncML standard can be utilized in connection with the device management concept. A synchronization server can act as a device management server and a client device as a device to be managed (Device Management Client).

FIG. 2 illustrates device management (Client Management Session) according to a message of a synchronization protocol. In a session initialization message, a client device (MS) transmits to a synchronization server S, which performs device management, information on itself (same information as in the synchronization) to the server, in response to which the server transmits information of its own and device management commands (Server Management Operations). The client device responds by status information, after which the server may finish the session or transmit more device management commands. If the server transmits more management commands, the client device should respond to this by status information. After receiving status information, the server may always finish the session or continue it by transmitting more device management commands. The device management protocol can also function in such a manner that questions concerning what the user likes to update are first transmitted to the user, and the information on the user's choices is transmitted to the server. After this, the server may transmit the updates/operations required by the user in the next packet.

According to the SyncML protocol, a client device typically starts a synchronization session. However, particularly in the context of device management there are cases in which the server has the need to start the synchronization. For this case, the SyncML specification "*SyncML Sync Protocol, version* 1.0.1", May 2001, chapter 8 (pages 49 to 50) describes a synchronization session initialization caused by a server (Server Alerted Sync): the server may send a (Sync Alert) request message, in which it requests the client device to start a SyncML session. After this, the client device starts the initialization of the SyncML session by transmitting a conventional (Client Initialization Package) packet. When the client device is a mobile station, problems arise due to the facts that the client device cannot be reached when the mobile station is switched off or that there is no continuous data transmission connection between the terminal and the server. This is why it is advantageous to use a service which stores the message when the request is transmitted. One of such services is SMS (Short Message Service), which stores a text message in a text message center and sends it when the mobile station is attached to the network and can be reached. Like other SyncML messages, a request for starting a session is in XML format and comprises a header field, which is determined in a [SyncHdr] element, and a body part, which is determined in a [SyncBody] element:

```
<SyncML>
    <SyncHdr>
    . . .
    </SyncHdr>
    <SyncBody>
    . . .
    </SyncBody>
</SyncML>
```

The request is relatively large and requires much greater capacity than 140 octets provided by the text message (which is sufficient for coding 160 ASCII characters of 7 bits). The request can be divided into several text messages, but it is possible that one of the text messages disappears, the messages arrive in wrong order or that the client device cannot process concatenated text messages. If a transport layer service is provided by WAP (Wireless Application Protocol), for instance, SyncML messages can be coded into binary WBXML format (Wireless Binary XML), and less data transmission capacity is required. Even though WBXML were used, the request still requires several text messages.

BRIEF DESCRIPTION OF THE INVENTION

It is thus an object of the invention to provide a method and an apparatus implementing the method such that the above-mentioned problems can be avoided. The objects of the invention are achieved by a method, a synchronization system, a synchronization server, an electronic device and computer programs, which are characterized in what is said in the independent claims. The preferred embodiments of the invention are disclosed in the dependent claims.

The invention is based on selecting only the most essential information which is further coded in such a manner that less space is required, compared to the situation in which the information would be transmitted in cleartext. The method comprises configuring a synchronization server to determine, for a request indicating the need for starting a session and to be transmitted to the mobile station, the identifier of the synchronization server, the identifier of a synchronization protocol version supported by the synchronization server and the identifier of the requested synchronization session. The maximum size of the message that is to be sent from the synchronization server to the mobile station for the request, and coding instructions, by which at least one of the identifiers can be coded into a bit sequence requiring substantially fewer bits than its ASCII presentation, are determined in the synchronization server. Decoding instructions, by means of which the original identifier is obtained from the bit sequence, are determined in the mobile station. When the purpose is to transmit to at least one mobile station a request indicating the need for starting a session, a message is formed, which message is shorter or as long as said maximum size and comprises at least said identifiers, at least one of which is presented as a bit sequence defined according to the coding instructions. The message is transmitted to the mobile station by using a message transmission service. The mobile station forms a session initialization message on the basis of the information included in the received message, at least part of information being defined from the received bit sequence according to said decoding instructions. The session initialization message is transmitted from the mobile station to the synchronization server. The coding utilizes the information concerning the different values the different fields can obtain. The correspondence between these values and the different bit patterns is stored in the coding instructions and decoding instructions to be used by the server and the client.

Neither a session nor its initialization is restricted to the functions defined in the SyncML, but is to be understood broadly to refer to a session to be established between any client device and synchronization server and to messages needed to establish the session. In a synchronization system, a session between a client device and a synchronization server can be established in order to synchronize user data or to manage the device.

The solution according to the invention provides the advantage that on the request of the server, a session can also be started in devices that do not support the reception of concatenated messages. When a message transport service, such as SMS, provided by the mobile network can be used, a message can always be delivered to its destination (when the device is switched on) also in devices which do not allow push services activated by the network. The solution of the invention also helps to avoid problems which result from the packet-switched network possibly delivering messages to the client in an order differing from the order in which the server has transmitted them, or some messages possibly even getting lost. In addition, as the transmission of a request requires less space, data transmission resources can also be saved and as a result, there are fewer costs. This saving can be very significant in cases where the server has to transmit a request to a large number of client devices.

BRIEF DESCRIPTION OF THE FIGURES

The invention will now be described in greater detail in connection with the preferred embodiments, with reference to the attached drawings, in which.

DETAILED DESCRIPTION OF THE INVENTION

In the following, a preferred embodiment of the invention is described in a system supporting the SyncML standard, it is to be noted, however, that the invention can be applied in any synchronization system.

Figure 1:
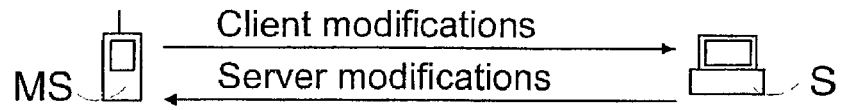
FIG. 1 illustrates synchronization according to the SyncML synchronization protocol.
Figure 2:
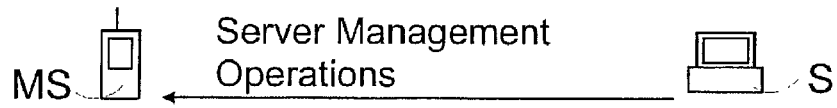
FIG. 2 illustrates device management by a server.
Figure 3A:
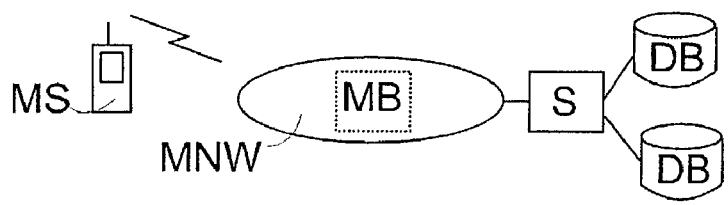
FIG. 3a illustrates a synchronization system.

FIG. 3a illustrates a networked system in which data of databases can be synchronized between synchronization servers S and mobile stations MS. In the synchronization, the MS can act as a client device and thus comprise a database to be synchronized. The server S can serve several client devices MS. It is also possible that the mobile station acts as a server for another device. The MS communicates with the server S through a mobile network MNW (Mobile Network). It is also possible that the S is implemented in the mobile network MNW. The client device MS, which has been attached to the network MNW, comprises a mobile station functionality to communicate with the network MNW wirelessly. Instead of a conventional mobile station, the MS may also be any electronic device comprising a messaging functionality, such as a portable computer or a PDA device, or alternatively, for instance, an auxiliary device of these devices, which is arranged in connection with its host device by means of its messaging functionality so that a short-range radio link, for instance, is used. In this case, the host device should be capable of concluding on the basis of part of information coded into the message that the message is intended for the auxiliary device. The mobile network MNW comprises at least a block MB providing a message service. Between the mobile network MNW and the server S there may also be other networks, such as a local area network LAN. The mobile network MNW may be any known wireless network, such as a network supporting a GSM service, a network supporting a GPRS service (General Packet Radio Service), a third generation mobile network, such as a UMTS network (Universal Mobile Telecommunications System), a wireless local area network WLAN or a private network.

If the MNW is a GSM network, the block MB providing a message service comprises at least a short message service center SMSC. An important transport layer service in several mobile networks is WAP, which comprises a WSP layer (Wireless Session Protocol), which can be used for providing a transport service for the synchronization application layer in the client device MS and in the server S. The WAP supports several lower level transmission technologies, such as a SMS-based transmission. Also HTTP or OBEX standards, for instance, and lower layer transmission technologies supported by them can be used. The server S itself may comprise a database it has synchronized, or the database synchronized by it can be located in another device, in FIG. 3a servers S and databases DB are separated for the sake of clarity.

Figure 3B:
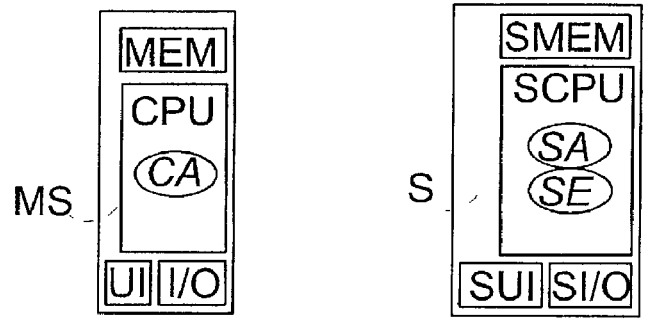
FIG. 3b illustrates a synchronization server and a client device.

As illustrated in FIG. 3b, mobile stations MS and servers S comprise memory MEM; SMEM, a user interface UI; SUI, I/O means I/O; SI/O for arranging data transmission, and a central processing unit CPU; SCPU comprising one or more processors. The memory MEM; SMEM has a non-volatile part for storing applications controlling the central processing unit CPU; SCPU and other data to be maintained, and a volatile part to be used for temporary data processing. Application data, which is the object of the synchronization, is maintained in the memory MEM of the MS (which is, in the example, a database to be synchronized for the synchronization) and in the memory of the databases DB.

Figure 4:
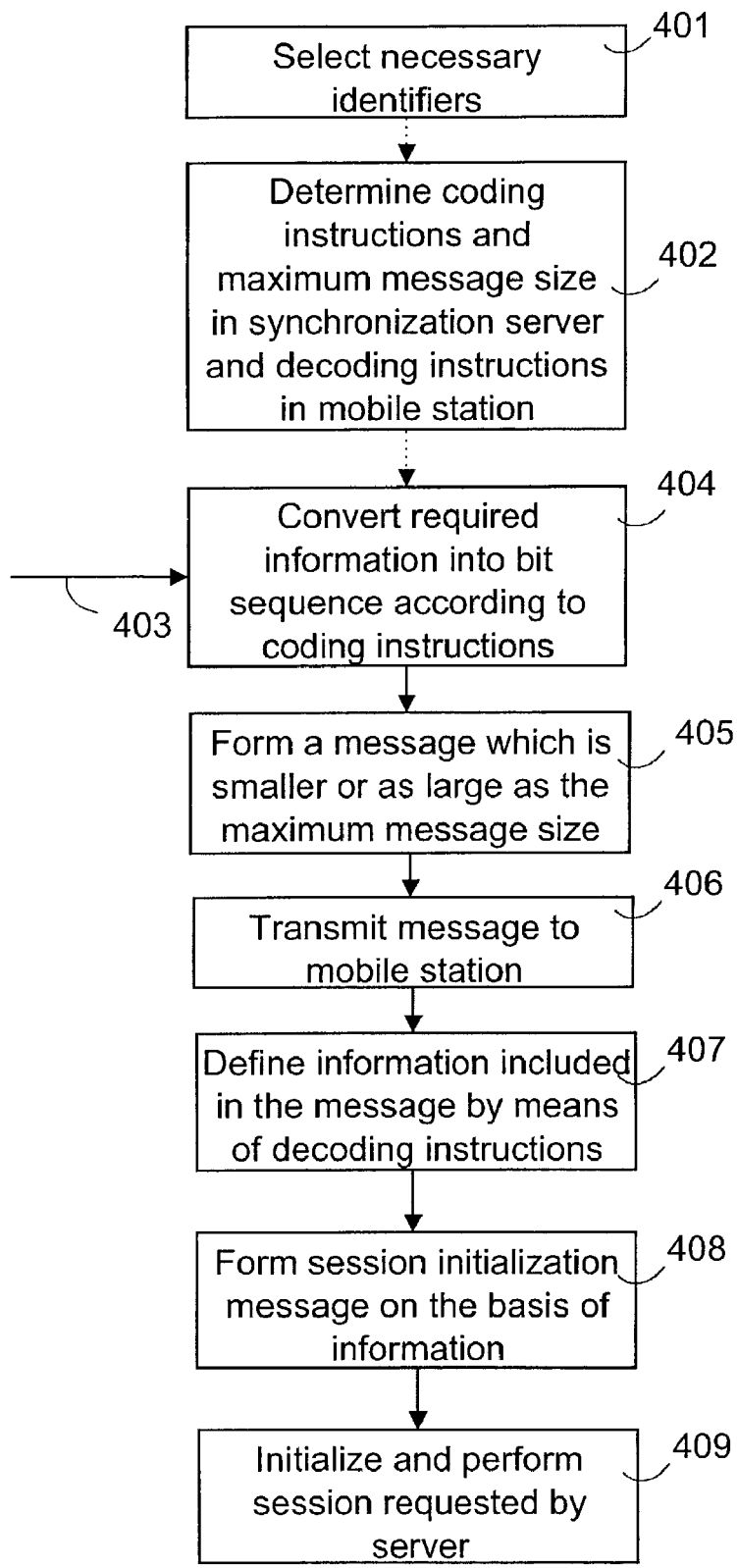
FIG. 4 illustrates a method according to a preferred embodiment of the invention.
Figure 6:
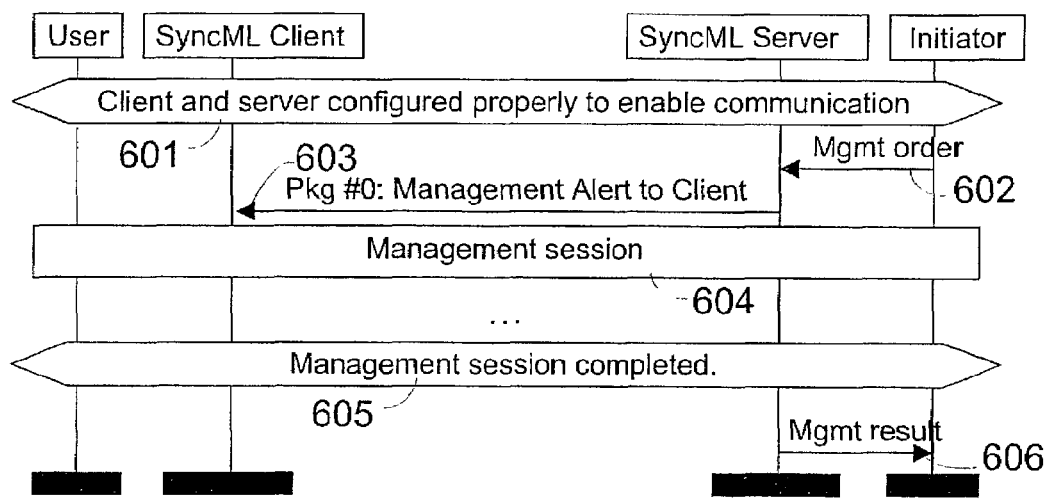
FIG. 6 is a signaling diagram of a management session according to a preferred embodiment of the invention.

The client device MS comprises a client agent CA, which is responsible for session-related functions in the client device. The server S comprises a server agent SA managing the session and a synchronization engine SE. The CA is preferably implemented by the CPU executing a computer program code stored in the memory MEM, and the SA, SE are implemented by the SCPU executing a computer program code stored in the memory SMEM. These means can also be arranged to implement a device management session or the device management session can be managed by separate entities, which are not shown in FIG. 3b. By means of computer program codes executed in the central processing units CPU and SCPU, the client device MS and the synchronization server S are also made to implement inventive means, embodiments of which are illustrated in FIGS. 4 and 6. Computer programs can be obtained through the network and/or stored in memory means, such as a diskette, a CD-ROM or other external memory means, from which they can be loaded in the memory MEM, SMEM. Hardware solutions or a combination of hardware and software solutions can also be used.

FIG. 4 illustrates a method according to a preferred embodiment of the invention. Information on the identifiers required for a request indicating the need for starting a session (for synchronizing user data or for device management) is set 401 in the synchronization server. These include at least the identifier of a synchronization server, the identifier of a synchronization protocol version supported by the synchronization server and the identifier of the requested synchronization session. Coding instructions and the maximum size for the messages that are sent to indicate the need for starting a session are determined 402 in the synchronization server S. The maximum size can be determined according to the used message transmission service, e.g. according to the maximum size for a text message in the SMS service. The determination can be performed such that a numerical value for the maximum size is directly set to the device, for instance, or the device is arranged to place the fields in such places in the message that the length of the message will be within this maximum size. The maximum size can also be determined by inquiring the network of this information or it can be delivered to the device in the management session, for example. The user may also enter the maximum size. The message system of the device is at least arranged to notify the application forming the message when the message size is too large. Decoding instructions are determined 402 in the mobile station MS acting as a client device. By using the coding instructions, the S can code at least one of the identifiers to be transmitted into a bit sequence requiring substantially fewer bits than the ASCII presentation or WBXML binary presentation of the identifier. By using the coding instructions, the client device, for its part, can define the original identifier from the bit sequence.

When a request indicating the need for starting a session needs to be transmitted 403 from a server to at least one client device, the server S defines 404, according to the coding instructions, at least one bit sequence for at least part of information required in the message. The message requires at least the identifiers mentioned below, but typically it also includes other information. The information to be transmitted is formed 405 into one message. The server S also controls 405 that the message does not exceed the defined maximum size. If the message seems to exceed the maximum size, the server S may delete less important fields from it and/or, by using the coding instructions, code more information into a form which requires less space. The message is transmitted 406 from the server S to the client device MS by using the message transmission service of the network MNW. According to an embodiment, an SMS service known to a person skilled in the art can be used for transmitting the message. In the client device MS, the information according to the bit sequences in the received message is defined 407 for the initialization message by using the coding instructions stored in the client device. Based on at least one identifier obtained in this way and other information included in the message, the MS forms 408 a session initialization message and transmits 409 it to the synchronization server S.

The session can be used for device management functions, whereby the operation of the synchronization application (CA) of the client device MS can be adapted on the network's initiative. For instance, if the address of the synchronization server (URI identifier) has changed, it is important to make this known to every device that synchronizes with this server. In the SyncML, this request transmitted by the server in order to start a device management session can be called [Package #0: Management Alert to Client], because the initialization packet to be transmitted for the initialization on the basis of the request is [Package #1: Client Initialization]. It is also possible to use the session for the personalization performed by the user himself. The user may adapt the settings through a WWW interface, for instance, and on the initiative of the synchronization server S these changes can be transferred to the client device MS during the session.

Figure 5:
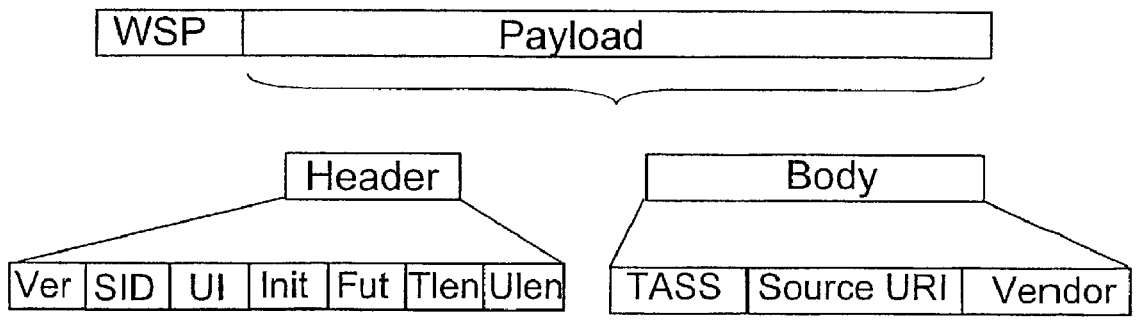
FIG. 5 shows possible elements of a message to be sent in order to start a device management session.

FIG. 5 illustrates possible elements of a message formed (405) in order to start a device management session. According to a preferred embodiment, a push service of the WSP protocol is applied by using SMS messages, whereby the message comprises a WSP header field. The WSP header field must be short enough (preferably less than 30 bytes) so that there is enough space for the payload intended for the actual application level (CA) processing the message. It is to be noted that in addition to the WSP field, the message may also comprise other header fields, such as WDP header fields. In this case, however, the proportion of the SyncML payload decreases. According to an embodiment, the message may also provide an indication of the application to which the content of the message should be addressed. On the basis of the indication, the MS can direct the payload of the message to the right application entity, e.g. a request for starting a management session to a client agent CA. The indication may be included in the WSP or WDP header field of the message. A device supporting the WAP protocol easily recognizes the information from the message, but a non-WAP device has to be provided with a predetermined location, from which the indication of the application has to be retrieved. This location can be determined by using a predetermined location from the beginning of the message (offset) or such that the indication always occurs after a certain character in the header field. For example, in the WSP header field the indication may be in the identifier 'Application—ID' (x-wap-application-id), the MIME field can also be utilized instead of the 'Application ID' field or to specify the information of the 'Application ID' field.

In the following, fields that can be used in the message are described.

Version (VER). Contains the message version to be used and thus also the protocol version so that the client device can check whether the server S supports the same version. The version identifier may alternatively indicate only the message version or the protocol version. The client device need not start (408, 409) the session if it supports a different version. The version identifier can be coded according to the coding instructions set in the server S into a shorter bit sequence, for instance such that the first 10 bits after the WSP header field are used: the last number refers to the smallest version numbers, the second last refers to ones, the third last refers to tens and the fourth last refers to hundreds, in which case the largest possible version is '102.3' and the version '1.0' is coded into a bit sequence '0000001010'. As stated earlier, the MS comprises decoding instructions for determining (407) the original identifier from the bit sequence.

These coding instructions can be implemented in the device as a correspondence table illustrating which bit sequence corresponds to which version number. Alternatively, this table can be set to the device algorithmically so that its elements can be produced programmatically without needing to store the entire table in the device's memory. The correspondence table can be coded, for instance, like this:

| 0000001010 | Version 1.0 |
|---|---|
| 0000001011 | Version 1.1 |
| ... | ... |
| 1111111111 | Version 102.3 |

Session Identifier (SID). This field determines the session identifier, so that the same session is not performed more than once. For this identifier, 16 bits after the version identifier, for instance, can be used. For instance, if the client device is switched off, the server S may send several messages, by means of which the server attempts to establish one specific management session. On the basis of the SID identifier, the client device can conclude that it should start only one connection and not set up a connection according to every obtained message. The server S may also prioritize device management sessions by means of the SID field, for instance by defining a specific SID identifier to less important device management operations. When the client device sets up a connection to establish a session, the server S can prevent the session from being established, if it has more urgent client devices to serve. This can be arranged such that the server S stores in its memory the information that the session corresponding to the transmitted SID identifier is less important. This can be arranged alternatively so that SID identifiers selected from a specific group, for instance, are less important, which makes it possible to avoid the storage of information.

User Interaction Mode (UI). By this identifier, the server may recommend whether the session should be carried out in the background or whether the user should be informed of the session. This field can be coded by two bits according to the following correspondence table, for instance:

| 00 | server has no recommendation |
|---|---|
| 01 | recommend performance in the background (not shown to user) |
| 10 | show informing identifier to user |
| 11 | ask permission from user |

Initiative of the Management Action (Init). By this identifier, the server S may communicate to the client device, whether it itself has caused the management session or whether the client device (its user) has caused it. This information may form a basis for the billing, and so the user of the client device can also be billed for the request transmitted by the server, if the user has caused, i.e. ordered it. The information can be coded by two bits according to the following correspondence table, for instance:

| 01 | client's initiative |
|---|---|
| 10 | server's initiative |

Future Use of the Device Management (Fut). In the field, possible information which is to be defined later can be transferred from the server S to the client device MS for the management session. For instance, 30 bits of space can be reserved. One possible example of information to be transferred in this field is a moment at which the client device should establish a session to the synchronization server S. The MS can transmit the initialization message (409) at the time set by the server, and the server S may, for instance, balance its load by setting the different client devices to set up a connection at different times.

Length of the Trigger Authentication Shared Secret (Tlen). This field indicates the length of the TASS field (Trigger Authentication Shared Secret).

Length of the Source (Ulen). This field indicates the length of the identifier (URI) of the server S. By using this field and the Tien field, the largest possible space can be arranged for the URI field. If only fields of specific lengths were used, there would often be unused space at the end of the TASS field.

Trigger Authentication Shared Secret (TASS). The TASS field contains a shared secret, by which DoS attacks (Denial of Service) are prevented. This field can also be used to determine the server identifier.

Source URI of the Management Server (Source URI). The field contains the URI identifier of the server, In certain cases, this field can also be shortened by leaving out the protocol identifier, for instance, or, instead of the server address, transmitting only the shorter identifier in the field. Alternatively, the TASS field can be used for transmitting the server identifier.

Vendor (Vendor). This field is optional and may include manufacturer-specific information as much as the message can take after the preceding fields.

In the above-mentioned fields the payload is planned so that as little space as possible would be needed. If all fields were transmitted as text in XML format, about 400 characters, i.e. thousands of bits, would be needed. One field takes up at least a few characters, i.e. dozens of bits. When at least some of the fields utilize the above-mentioned coding methods, each of which is derived from the knowledge concerning the different values each field can take, it is possible to save space significantly and make (by further deleting less important fields, if necessary) the information fit into one SMS message. Appendix 1, which is a part of the specification, shows another example of message fields, as far as only the SyncML payload is concerned.

FIG. 6 shows a signaling diagram of a device management session, which is started on the request of the synchronization server (S). When the server and the client device (MS) can communicate 601 (at least so that the MS is capable of receiving messages, also the steps 401 to 402 of FIG. 4 have been performed), the server receives 602 a command to start a management session from the server user, from outside the server or on the basis of a predetermined setting. In response, the server collects the necessary data, carries out the changes according to the coding instructions and transmits 603 a message according to the request [Package #0:Management Alert to Client] to the client device. Based on this, the client device and the server can establish a management session 604. The server S can transmit management commands to the client device, and the client device alters its configuration on the basis of these management commands. After the management session is completed 605, the result can be presented 606 for the server user.

The session can be used to synchronize conventional user data, e.g. to update calendar markings of the mobile station and the calendar application of the network. In this case, an initiative to start the synchronization (403) can take place, for instance, when a new important calendar marking, which needs to be delivered in the mobile station as soon as possible, is added to the network calendar. Like the message formed for the device management session and illustrated in FIG. 4, the message that is formed in order to request a SyncML session comprises several corresponding fields. At least fields marked with a star Version (VER*), Session Identifier (SID*), Source and URI of the Management Server (URI*) are also required in the message to be formed for the request for starting the synchronization. Information of at least the fields (UI), (VER*) and (Init) can be converted into a short bit sequence in the manner described above. The message may also include information on the synchronization session the server requires. Such information includes, particularly, an indication of the synchronization type required by the server S (e.g. Two-way, One way sync from server only, One way from client only, Refresh Sync from server only). This information can also be coded (404) and decoded (407) by utilizing a prestored (402) correspondence table, whereby the number of required bits can be saved. It may also be useful to transmit the identifier (URI) of the database (which the server needs to synchronize) in the message. After the SyncML client device MS receives the message, it may transmit (409) a synchronization session initialization packet (Sync Initialization Package from Client) according to the information included in the message, and the synchronization session can be initialized. For a more specific description of the synchronization session of the SyncML protocol and the information required for it, the SyncML specification "*SyncML Sync Protocol, version 1.0.1*", May 2001, is incorporated in the application as a reference. Thus, the same advantages can be achieved when both a management session and a user data synchronization session are started on the request of the synchronization server.

It is also possible that said message is formed 405 somewhere else than in the server S which transmits the request. A situation like this may occur, for instance, when a client device communicates with a WAP gateway by means of a WAP stack, and an HTTP protocol is used between the WAP gateway and the server S. The WAP gateway, for instance, can then condense the request transmitted by the server in a manner described above (by using coding instructions) so that it can be transmitted in one message to the client device MS.

It is obvious to a person skilled in the art that as technology develops, the basic idea of the invention can be implemented in a variety of ways. It is also to be noted that messages are not restricted to messages of the SMS service, but other types of message transmission services, such as an MMS service (Multimedia Messaging Service), can also be used. The invention and the embodiments thereof are thus not restricted to the examples described above, but may be modified within the scope of the claims.

APPENDIX 1

Example of information included in a message

| HEX value | Content | Description |
|---|---|---|
| | '0000001010' | Version '1.0' |
| | '0000000000000001' | Session identifier SID = '1' |
| | '01' | UI = '01' |
| | '00' | Init = '00' |
| | '00000000000000000000000000' | Future use |
| | '1000' | TASS length = '8' |
| | '0000100010' | URI length = '34' |
| 30, 30, 4A, 31, 59, 32, 55, 79 | '00J1Y2Uy' | TASS |
| 68, 74, 74, 70, 3A, 2F, 2F, 77, 77, 77, 2E, 6D, 6E, 67, 6D, 74, 73, 65, 72, 76, 65, 72, 2E, 63, 6F, 6D, 2F, 6D, 61, 6E, 61, 67, 65, 2F | 'http://www.mngmtserver.com/manage/' | URI |

The invention claimed is:

1. A method of starting a session in a synchronization system which comprises at least one electronic device acting as a client device and comprising communication means, at least one synchronization server and a communication network providing a message transmission service, the method comprising:
   configuring the synchronization server to determine, for a request, indicating a need for starting a session and to be transmitted to the client device, an identifier of the synchronization server, a version identifier and an identifier of the requested synchronization session,
   determining in the synchronization server a maximum size for a message that is to be sent from the synchronization server to the client device for the request,
   determining coding instructions, by which at least one of the identifiers can be coded into a bit sequence requiring substantially fewer bits than an ASCII presentation, of the at least one of the identifiers, in the synchronization server, and decoding instructions, by means of which the original identifier is obtained from the bit sequence, in the client device,
   in response to a need for transmitting the request indicating the need for starting a session to at least one client device, forming one message, which message is shorter or as long as said maximum size and comprises at least said identifiers, at least one of which is presented as a bit sequence defined according to the coding instructions,
   transmitting the message to the client device by using said message transmission service,
   forming a session initialization message on the basis of information included in the received message, at least part of the information being defined from the received bit sequence by means of the decoding instructions, and
   transmitting the session initialization message from the client device to the synchronization server.

2. A method as claimed in claim 1, wherein a transport layer service in the synchronization system is configured using a WAP protocol, whereby the message further comprises WSP header fields (Wireless Session Protocol).

3. A method as claimed in claim 2, wherein the message also denotes an application to which the content of the message should be directed, the denotion being defined by setting the information on the application to a predetermined location as from the beginning of the message or after a predetermined character, and the content of the message is directed in the client device to the application denoted by the message.

4. A method as claimed in claim 1, wherein the message transmission service is SMS.

5. A method as claimed in claim 1, wherein the identifier of the synchronization server is determined in the field containing a shared secret.

6. A method as claimed in claim 1, wherein the synchronization server is also configured to determine a bit sequence in the message, indicating whether the client or the server has caused the message.

7. A method as claimed in claim 1, wherein the coding instructions and the decoding instructions comprise one or more correspondence tables.

8. A method as claimed in claim 1, wherein the session is initialized for synchronizing a data set included in the client device and at least one database.

9. A method as claimed in claim 1, wherein the synchronization server transmits a request for starting a device management session, and the management session is initialized between the server and the client device.

10. A synchronization server, which synchronization server is configured to determine, for a request, indicating a need for starting a session and to be transmitted to at least one client device, an identifier of the synchronization server, a version identifier and an identifier of the requested synchronization session, the synchronization server is configured to determine a maximum size for a message that is to be sent from the synchronization server to the client device for the request, in which synchronization server coding instructions, by which at least one of the identifiers can be coded into a bit sequence requiring substantially fewer bits than an ASCII presentation of the at least one of the identifiers, are determined, which synchronization server, in response to need of transmitting the request indicating the need for starting a session to at least one client device, is configured to form one message, which message is shorter or as long as said maximum size and comprises at least said identifiers, at least one of which is presented as a bit sequence defined according to the coding instructions, and which synchronization server is configured to transmit the message to at least one client device by utilizing a message transmission service.

11. A synchronization server according to claim 10, wherein a transport layer service is configured by using a WAP protocol, whereby the message further comprises WSP header fields (Wireless Session Protocol).

12. A synchronization server according to claim 10, wherein the message also denotes an application to which the content of the message should be directed, the synchronization server being configured to define the denotion by setting the information on the application to a predetermined location as from the beginning of the message or after a predetermined character.

13. A synchronization server according to claim 10, wherein the message transmission service is SMS.

14. A synchronization server as claimed in claim 10, wherein the synchronization server is configured to determine the identifier of the synchronization server in the field containing a shared secret.

15. A synchronization server according to claim 10, wherein the synchronization server is also configured to determine a bit sequence in the message, indicating whether the client or the server has caused the message.

16. A synchronization server according to claim 10, wherein the coding instructions comprise one or more correspondence tables.

17. A synchronization server according to claim 10, wherein the synchronization server is configured to initialize the session for synchronizing a data set included in the client device and at least one database.

18. A synchronization server according to claim 10, wherein the synchronization server is configured to transmit a request for starting a device management session, and the synchronization server is configured to initialize the management session between the server and the client device.

19. An electronic device comprising:
   means for receiving and transmitting messages;
   means for communicating with a synchronization server, for which synchronization server said electronic device acts as a client device;
   means for storing decoding instructions, by means of which decoding instructions an original identifier is obtainable from a bit sequence coded by the synchronization server and indicating in coded form at least one of: an identifier of the synchronization server, a version identifier and an identifier of a requested synchronization session;

means for converting at least one bit sequence included in a message received from the synchronization server into the original information on the basis of the decoding instructions;

means for forming an initialization message for a session between the synchronization server and said device on a basis of information indicated by the message received from the synchronization server, at least part of the information being defined from or at least one bit sequence included in the received message by means of the decoding instructions; and means for sending the initialization message for the session to the synchronization server.

20. An electronic device according to claim 19, wherein the electronic device comprises:

means for altering the configuration of said device according to commands received from the server during the session.

21. An electronic device according to claim 19, wherein a transport layer service is configured by using a WAP protocol, whereby the message further comprises WSP header fields (Wireless Session Protocol).

22. An electronic device according to claim 19, wherein the message also denotes an application to which the content of the message should be directed, the denotion being defined by information on the application in a predetermined location as from the beginning of the message or after a predetermined character; and the electronic device is configured to direct the content of the message to the application denoted by the message.

23. An electronic device according to claim 19, wherein the electronic device is configured to communicate with the synchronization server by SMS.

24. An electronic device according to claim 19, wherein the electronic device is configured to determine the identifier of the synchronization server from the field containing a shared secret.

25. An electronic device according to claim 19, wherein the decoding instructions comprise one or more correspondence tables.

26. An electronic device according to claim 19, wherein the synchronization server is a device management server and the session is a device management session.

27. A synchronization system comprising at least one electronic device acting as a client device and comprising communication means, at least one synchronization server and a communication network providing a message transmission service, in which synchronization system:

the synchronization server is configured to determine, for a request, indicating a need for starting a session and to be transmitted to the client device, an identifier of the synchronization server, a version identifier and an identifier of the requested synchronization session, the synchronization server is configured to determine a maximum size for a message that is to be sent from the synchronization server to the client device for the request, coding instructions, by which at least one of the identifiers can be coded into a bit sequence requiring substantially fewer bits than an ASCII presentation of the at least one of the identifiers, are determined in the synchronization server, and decoding instructions, by means of which the original identifier is obtained from the bit sequence, are determined in the client device, in response to the need for transmitting the request indicating the need for starting a session to at least one client device, the synchronization server is configured to form one message, which message is shorter or as long as said maximum size and comprises at least said identifiers, at least one of which is presented as a bit sequence defined according to the coding instructions, the synchronization server is configured to transmit the message to the client device by utilizing the message transmission service, the client device is configured to form a session initialization message on the basis of information included in the received message, at least part of the information being defined a received bit sequence by means of the decoding instructions, and the client device is configured to transmit the session initialization message to the synchronization server.

28. A computer program embodied on a computer readable storage medium, said program product comprising a computer program code, which, when being executed in a processor of a synchronization server, causes the synchronization server to:

determine, for a request indicating need for starting a session and to be transmitted to at least one client device, an identifier of the synchronization server, an identifier of a synchronization protocol version supported by the synchronization server and an identifier of the requested synchronization session, determine a maximum size for a message that is to be sent from the synchronization server to the client device for the request, set coding instructions, by which it can code at least one of the identifiers into a bit sequence requiring substantially fewer bits than an ASCII presentation of the at least one of the identifiers, in response to a need for transmitting the request, indicating the need for starting a session to at least one client device, forming one message, which message is shorter or as long as said maximum size and comprises at least said identifiers, at least one of which is presented as a bit sequence defined according to the coding instructions, and transmit the message to at least one client device by utilizing a message transmission service.

29. A computer program embodied on a computer readable storage medium, said computer program comprising program code, which, when being executed in a processor of an electronic device, causes the electronic device to:

set decoding instructions, by means of which decoding instructions an original identifier is obtainable from a bit sequence coded by a synchronization server and indicating in coded form at least one of following identifiers: and identifier of the synchronization server, a version identifier and an identifier of the a requested synchronization session;

convert at least one bit sequence included in a message received from the synchronization server into the original information on the basis of the decoding instructions;

form an initialization message for a session between the synchronization server and said device on the basis of information indicated by the message received from the synchronization server, at least part of the information being defined from the received bit sequence by means of the decoding instructions; and send the initialization message for the session to the synchronization server.

30. A method for indicating need for starting a synchronization session, comprising:
configuring a synchronization server to determine, for a request indicating a need for starting a session and to be transmitted to a client device, an identifier of the synchronization server, a version identifier and an identifier of a requested synchronization session,
determining in the synchronization server a maximum size for a message that is to be sent from the synchronization server to the client device for the request,
determining code instructions, by which at least one of the identifiers can be coded into a bit sequence requiring substantially fewer bits than the at least one identifier's ASCII presentation, in the synchronization server, and decoding instructions, by means of which the original identifier is obtained from the bit sequence, in the client device,
in response to a need for transmitting the request indicating the need for starting at session to at least one client device, forming one message, which message is shorter or as long as said maximum size and comprises at least said identifiers, at least one of which is presented as a bit sequence defined according to the coding instructions, and
transmitting the message to the client device by using a message transmission service.

31. An electronic device configured to communicate with a synchronization server, for which synchronization server the electronic device is configured to acts as a client device, the electronic device comprising:
a processor,
a memory for storing computer program code for controlling the processor, the memory comprising:
computer program code for decoding instructions, by means of which decoding instructions an original identifier is obtainable from a bit sequence coded by the synchronization server and indicating in coded form at least one of following identifiers: an identifier of the synchronization server, a version identifier and an identifier of a requested synchronization session;
computer program code for converting at least one bit sequence included in a message received from the synchronization server into original information on the basis of the decoding instructions;
computer program code for forming an initialization message for a session between the synchronization server and the electronic device on the basis of information indicated by the message received from the synchronization server, at least part of information in the initialization message being defined from the received bit sequence by means of the decoding instructions; and
computer program code for sending the initialization message for the session to the synchronization server.

32. An apparatus embodying a synchronization server, which synchronization server is configured to determine for a request, indicating a need for starting a session and to be transmitted to at least one client device, an identifier of the synchronization server, a version identifier and an identifier of the requested synchronization session, the synchronization server is configured to determine a maximum size for a message that is to be sent from the synchronization server to the client device for the request, in which synchronization server coding instructions, by which at least one of the identifiers can be coded into a bit sequence requiring substantially fewer bits than its ASCII presentation, are determined, which synchronization server, in response to a need for transmitting the request indicating the need for starting a session to at least one client device, is configured to form one message, which message is shorter or as long as said maximum size and comprises at least said identifiers, at least one of which is presented as a bit sequence defined according to the coding instructions, and which synchronization server is configured to transmit the message to at least one client device by utilizing a message transmission service.

* * * * *